[19] 3,851,333
Fishman [45] Nov. 26, 1974

[54] SPRAY INJECTION FOR TESTING AN ULTRASONIC LIQUID LEVEL DETECTOR
[76] Inventor: Sherman S. Fishman, P.O. Box 312, San Francisco, Calif. 94101
[22] Filed: July 31, 1969
[21] Appl. No.: 855,445

[52] U.S. Cl. .............................. 340/410, 73/290 V
[51] Int. Cl. ........................................... G08b 29/00
[58] Field of Search............. 340/244, 41 D, 25 KA; 73/170 A, 194 A, 290 V, 432 PS, 29, 67.5 R

[56] References Cited
UNITED STATES PATENTS
| | | | |
|---|---|---|---|
| 1,937,722 | 12/1933 | Simon et al. | 356/207 |
| 2,615,970 | 10/1952 | Bagno | 340/258 A |
| 3,050,997 | 8/1962 | Lake | 73/194 A |
| 3,214,728 | 10/1965 | Higgins | 73/170 A UX |
| 3,251,999 | 5/1966 | Middleton et al. | 356/207 X |
| 3,407,398 | 10/1968 | Stearn | 340/244 |

FOREIGN PATENTS OR APPLICATIONS
162,335   4/1964   U.S.S.R. ........................... 73/194 A

Primary Examiner—John W. Caldwell
Assistant Examiner—Daniel Myer

[57] ABSTRACT

An ultrasonic liquid level detector consisting of opposed ultrasonic sources in a glass pipe with a spray adaptor and pump means for simulating operational conditions with adaptors for other styles of ultrasonic probes.

2 Claims, 10 Drawing Figures

PATENTED NOV 26 1974 3,851,333
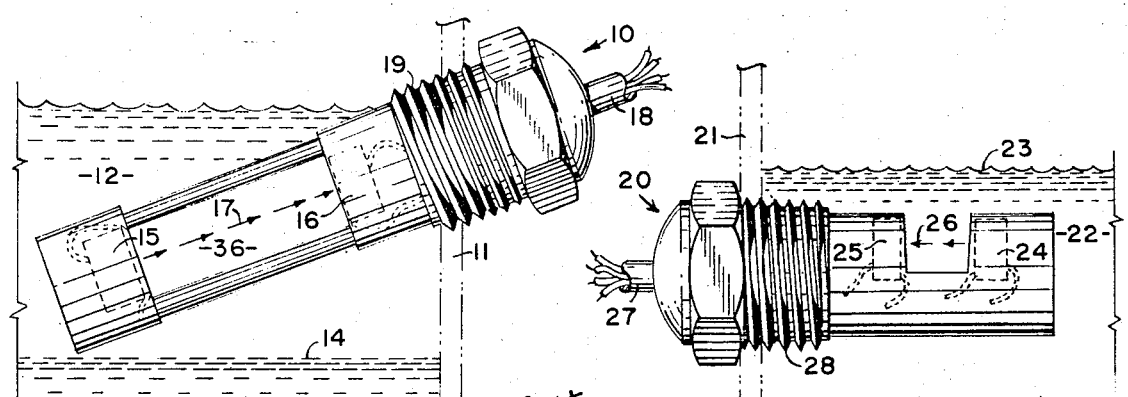
Fig. 1. Fig. 2.
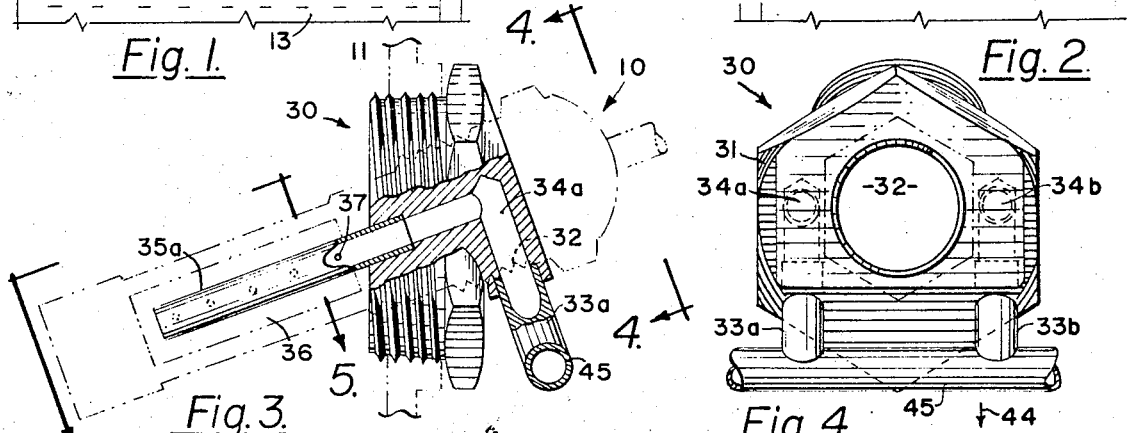
Fig. 3. Fig. 4.
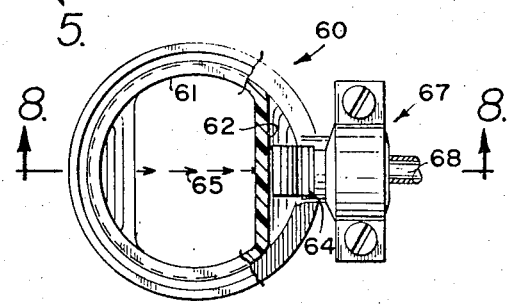
Fig. 5.
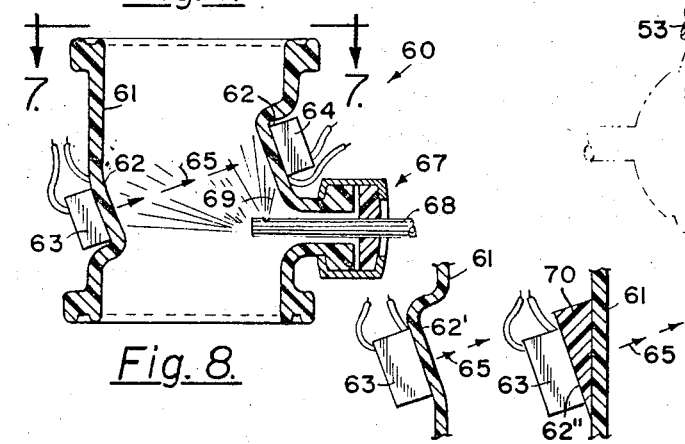
Fig. 7. Fig. 6.
Fig. 8. Fig. 9. Fig. 10.

SPRAY INJECTION FOR TESTING AN ULTRASONIC LIQUID LEVEL DETECTOR

This invention relates to liquid level and interface level detection using ultrasound as the physical phenomena to be measured, attenuated or detected. Liquid levels are important in the chemical process industry. For many years the best equipment available operated on principles of modified capacitance, conductivity, floating balls and in recent years radioactivity, magnetism and ultrasound. Because high frequency sound is rapidly attenuated in air but much less so in liquids, this characteristic is successfully used to indicate whether a probe is wet or dry. Such a probe will indicate when a tank is full, overflowing, low or empty. By known electronic means the signal indication from the probe can be used to start and stop a pump, open a drain, sound an alarm or shut down a reactive system.

There are special situations where the selection of the type of liquid level control is dictated by the nature of the substance to be sensed. The conductivity type device cannot be used if the substance is non-conductive. The capacitance type depends on a differing dielectric constant from air and which have a history of many failures; and floats which often become fouled. Ultrasonic devices depend upon the liquid transmitting sound. Ultrasonic probes in general use consist of opposing ultrasonic transducers where one sends a signal and the other receives the signal. If there is air between them the signal is not communicated across the gap and if there is liquid between them, the signal is transmitted from one transducer to the other through the liquid. This same principle is used in interface detection where the opposing transducers are not on a true horizontal but are at some small angle sufficient for the interface to reflect the ultrasonic signal away from the opposing transducer thereby giving an indication of the presence of the interface. An interface may also be detected by attenuation. The ultrasonic signal is adjusted in the lighter liquid phase to its minimal communicating energy to give a signal, and when the interface appears in the line of sight of the signal it is absorbed in the heavier liquid phase and is of insufficient energy to give a signal.

In chemical process plants, certain reagents can only be combined in glass-lined tanks with glass piping. Instrumentation cannot be installed in the sidewall of such glass-lined tanks. Putting controllers into such a tank from the top depends on the integrity of the sealing flanges which become very expensive. In emptying a glass-lined tank in which a two phase liquid exists, I have invented an ultrasonic interface detector which is a modified glass pipe and can be used to give a signal to shut a valve when one phase passes and the second phase begins, thus separating the two phases. The glass pipe detector can also be used to provide an output signal to shut off a pump when all the liquid has been removed and no liquid is in the tank. The electronics are all external.

An important part of all electronic equipment is the ability to test for operational integrity. The fail-safe characteristics of the circuit will determine its suitability for critical installations. Nuclear reactors and space oriented support equipment demands the highest degree of reliability possible. It is common to install simulated operational sequences for electronic circuits. It is more difficult to test for the operational integrity of the ultrasonic part of the circuit which in this instance is the probe.

By creating an environment around the probe as though it were under operating conditions, the ultrasonic transducers can be activated. This is done by putting spray jets around the transducers and signal path and using pumps so as to flood the ultrasonic pathway with either liquid or gas. A trough may be installed under the probe so that it will fill and immerse the probe or confine the spray during testing. The trough would have a small drain to allow it to drip slowly to its normal empty condition.

It is an object of this invention to provide a method and apparatus to simulate the operating ultrasonic parts of the circuit.

It is an additional object of this invention to provide a glass ultrasonic liquid level detector specifically adaptable to glass-lined tanks which are used in the chemical process industry where metal corrosion would occur if metal tanks were used.

The glass ultrasonic probe and adaptors are illustrated in the attached drawing, where FIG. 1 is a side elevation view of a typical ultrasonic liquid interface probe installed in a tank or pipe wall.

FIG. 2 is a side elevation view of a typical ultrasonic liquid level probe installed in a tank or pipe wall.

FIG. 3 is a side elevation view of a typical ultrasonic liquid interface probe installed in an ultrasonic circuit test module.

FIG. 4 is an outside end elevation view of the interface probe ultrasonic circuit test module.

FIG. 5 is a plan view showing the interface probe test injector tubes and solenoid valves.

FIG. 6 is a side elevation view of a typical ultrasonic liquidlevel probe installed in an ultrasonic circuit test module.

FIG. 7 is a plan view of a glass pipe section showing the path of the ultrasonic beam.

FIG. 8 is a side elevation view of a glass pipe section adapted for ultrasonic liquid level or interface detection and ultrasonic circuit testing.

FIG. 9 shows a second embodiment of a glass pipe section with an ultrasonic transducer.

FIG. 10 shows a third embodiment of a glass pipe section with an ultrasonic transducer.

In FIG. 1 assembly 10 is a typical ultrasonic liquid-interface probe which functions by propagating an ultrasonic beam 17 from an ultrasonic transducer 15 which is transmitted along the signal path 36 to be received by ultrasonic transducer 16 which then generates a signal which is transmitted through suitable cables 18 to an electronic alarm system (not shown). Assembly 10 is installed in a tank or pipe wall 11 at a small angle by means of the threaded section 19 so that when the lower liquid 13, ie., water or condensate, meets the upper liquid 12, ie. oil, the interface 14 which is formed at the boundary between the oil and water can be detected when said interface 14 is rising and being horizontal it will intersect the ultrasonic signal pathway 17. When this happens the index of ultrasonic refraction in water being different from the index in oil, the ultrasonic signal will be deflected and will not reach the receiving transducer 16 in sufficient signal strength to generate an alarm signal. If the probe 10 were installed at a true horizontal it would not function as an interface detector but as a liquid detector.

In FIG. 2 assembly 20 is a typical ultrasonic liquid level probe which is usually mounted at right angles in a tank or pipe wall 21 by the threaded section 28. An ultrasonic beam 26 is generated by ultrasonic transducer 24 and is received by the ultrasonic transducer 25 which then generates an alarm signal which is carried by cables 27 to the alarm circuitry (not shown). When the assembly 20 is immersed in liquid 22 so that the liquid surface 23 is above the probe 20 then the liquid will allow the signal to be conducted across the gap to close the circuit. If the probe 20 were in air then the ultrasonic signal would not be conducted across the gap between the two transducers 24 & 25 and no ultrasonic signal would be generated indicating that the probe was not in liquid.

FIG. 3 illustrates our apparatus for testing for the integrity of the ultrasonic circuit. The interface assembly 10 is mounted in an interface test module 30 by means of the threaded hole 32 into which the interface assembly 10 fits. An injector tube 35A having spray jet openings 37 along its inner aspect facing the ultrasonic signal path 36 communicates with entry tube 34A which joins the manifold tube 45 at the tubular joint 33A.

In FIG. 4 it is shown that entry tube 34B is parallel to entry tube 34A and on the opposite side of the threaded hole 32 with connections to the manifold 45 at the tubular joint 33B. Threaded hexagonal adaptor 31 provides the means for attachment to a tank or pipe wall 11.

FIG. 5 shows the ultrasonic test module in operation with the interface probe assembly 10 in position. We select inlet 43 to admit an inert gas or non-reactive gas which passes through a solenoid valve 41 entering the manifold 45 and filling the tube joints 33A, 33B and the entry tube 35A, 35B and being ejected in a spray 38 through the spray jet openings 37 to interrupt the ultrasonic signal beam 17 when it is immersed in a liquid. When the interface probe assembly 10 and the ultrasonic test module 30 is above the liquid level and in dryness, the ultrasonic circuitry is tested by purging with a liquid passing through inlet 44 through solenoid valve 42 and following the same course as the gas to create a deluge of liquid along the ultrasonic signal path 17 which allows for transmission of the ultrasonic signal under a simulated liquid environment.

FIG. 6 shows a single point liquid level probe assembly 20 fitted into a threaded hole 52 in the threaded hexagonal mounting stud or pipe adaptor 50, a hole 54 accommodates the injector tube 55 which has spary jet holes 57 facing the ultrasonic gap 56. A flange may be used instead of the threaded adaptor. A manifold system 45 (shown in FIG. 5) is connected to the tubular joint 53 and the same system of purging with liquid or gas creates a purge spray 58 which will complete or interfere with the ultrasonic signal in the gap 56 depending upon whether we are conducting the test under wet or dry conditions. The adaptor 50 is attached to the wall 21 by means of threads 51.

FIG. 7 shows the glass liquid level sensor assembly 60 in section to illustrate the path of the ultrasonic beam 65.

FIG. 8 is a glass liquid level sensor 60 composed of a glass pipe or cylinder to which the ultrasonic transducers are attached in the proper angle orientation (shown) or in true horizontal (not shown) so that the glass pipe section with its injector tube system becomes an integral part of a glass lined tank as an inlet, outlet or overflow pipe. The pipe wall 61 has an optically flat indentation 62 to which is attached the ultrasonic transducers 63 and 64. The ultrasonic beam 65 can be interrupted by a gas or liquid jet 69 emitted from the glass injector tube 68 which passes through the sealed side arm assembly 67.

Alternate approaches to the installation of the ultrasonic transducers is shown in FIG. 9 where the optical flat is a protrusion 62 which allows for more perfect axial flow within the glass pipe or as in FIG. 10 the ultrasonic transducers 63 is shown acoustically coupled to the glass wall by means of a coupling block 70 which will transmit sound from the transducer 63 along the pathway 65 without any modification of the cylinder wall.

It is not the intention of this invention to limit its use to the embodiments shown, but to embrace those situations where the ultrasonics of the circuit are tested for operational integrity by simulating the environment under which it would be operating, thus providing a failsafe trial upon which confidence can be placed for the reliability of the device, with special reference to liquid level detection in glass-lined tanks.

I claim:
1. An ultrasonic liquid level detector comprising a glass tube open at both ends, an emitting ultrasonic transducer mounted on the side of the tube having its emitting surface facing the tube interior; a receiving ultrasonic transducer mounted on the side of the tube opposite the emitting transducer and having its receiving surface generally parallel to the emitting surface of the emitting transducer, means for activating the emitting transducer to cause emission of an ultrasonic beam, a liquid spray injector mounted in the tube arranged to direct a liquid spray into the gap between the emitting transducer and the receiving transducer so as to provide a conducting sound path and means for injecting such a spray following any substantial drop in the energy received by the receiving transducer.

2. An ultrasonic liquid level detector comprising a glass tube open at both ends, an emitting ultrasonic transducer mounted on the side of the tube having its emitting surface facing the tube interior; a receiving ultrasonic transducer mounted on the side of the tube opposite the emitting transducer and having its receiving surface generally parallel to the emitting surface of the emitting transducer, means for activating the emitting transducer to cause emission of an ultrasonic beam, a gaseous spray injector mounted in the tube, arranged to direct a gaseous spray into the gap between the emitting transducer and the receiving transducer so as to interrupt any conducting sound path, and means for injecting such spray following any substantial increase in the energy received by the receiving transducer.

* * * * *

UNITED STATES PATENT OFFICE
CERTIFICATE OF CORRECTION

Patent No. 3,851,333　　　　　　　　Dated November 26, 1974

Inventor(s) Sherman S. Fishman

It is certified that error appears in the above-identified patent and that said Letters Patent are hereby corrected as shown below:

On the cover sheet item [76] "P. O. Box 312" should read -- P. O. Box 321 --.

Signed and sealed this 11th day of February 1975.

(SEAL)
Attest:

RUTH C. MASON
Attesting Officer

C. MARSHALL DANN
Commissioner of Patents
and Trademarks